US012651025B2

(12) United States Patent
Riva et al.

(10) Patent No.: US 12,651,025 B2
(45) Date of Patent: Jun. 9, 2026

(54) CONSTRUCTING A SEARCH INDEX BASED ON AN AUTOMATICALLY-SELECTED SET OF DOCUMENT PROPERTIES

(71) Applicant: Oramasearch Inc., San Francisco, CA (US)

(72) Inventors: Michele Riva, San Francisco, CA (US); Tommaso Allevi, Milan (IT); Issac Roth, San Francisco, CA (US)

(73) Assignee: Oramasearch Inc., San Francisco, CA (US)

( * ) Notice: Subject to any disclaimer, the term of this patent is extended or adjusted under 35 U.S.C. 154(b) by 0 days.

(21) Appl. No.: 19/175,928

(22) Filed: Apr. 10, 2025

(65) Prior Publication Data

US 2025/0322019 A1    Oct. 16, 2025

Related U.S. Application Data

(60) Provisional application No. 63/633,411, filed on Apr. 12, 2024.

(51) Int. Cl.
*G06F 7/00* (2006.01)
*G06F 16/901* (2019.01)
*G06F 16/93* (2019.01)

(52) U.S. Cl.
CPC .......... *G06F 16/9027* (2019.01); *G06F 16/93* (2019.01)

(58) Field of Classification Search
CPC ............................ G06F 16/9027; G06F 16/93
See application file for complete search history.

(56) References Cited

U.S. PATENT DOCUMENTS

| | | | | |
|---|---|---|---|---|
| 7,668,825 B2* | 2/2010 | Vogel | .................... | G06F 16/951 |
| | | | | 707/715 |
| 7,693,813 B1* | 4/2010 | Cao | ........................ | G06F 16/951 |
| | | | | 707/999.001 |
| 9,275,093 B2* | 3/2016 | Pandey | ............... | G06F 16/2264 |
| 9,342,553 B1* | 5/2016 | Fuller | .................... | G06F 16/245 |
| 11,210,349 B1* | 12/2021 | Schwartz | ................ | G06F 16/94 |
| 11,829,426 B1* | 11/2023 | Riva | ...................... | G06F 16/322 |
| 12,067,039 B1* | 8/2024 | Campos | ............... | G06V 30/412 |
| 2007/0038931 A1* | 2/2007 | Allaire | ............... | G06Q 30/0601 |
| | | | | 715/208 |
| 2007/0124151 A1* | 5/2007 | Shin | ........................ | G06F 21/10 |
| | | | | 705/1.1 |
| 2007/0271308 A1* | 11/2007 | Bentley | .................... | G06F 16/93 |
| 2010/0100546 A1* | 4/2010 | Kohler | .................... | G06F 16/40 |
| | | | | 707/739 |
| 2014/0052548 A1* | 2/2014 | Dokken, Jr. | ........... | G06Q 50/01 |
| | | | | 705/14.73 |
| 2014/0149466 A1* | 5/2014 | Sato | .................... | G06F 11/3013 |
| | | | | 707/803 |

(Continued)

*Primary Examiner* — Mohammed R Uddin
(74) *Attorney, Agent, or Firm* — Seed Intellectual Property Law Group LLP

(57) ABSTRACT

A facility is described for automatically selecting document properties to be included in an index on a corpus of documents. In some cases, the facility performs this automatic selection by subjecting the documents of the corpus to an inference model. In some cases, the facility performs this automatic selection by submitting to a large language model a prompt automatically constructed to include, for each of one or more example documents, (1) the example document's contents, and (2) a list of properties of the sample document that should be indexed.

24 Claims, 13 Drawing Sheets

(56) References Cited

U.S. PATENT DOCUMENTS

| | | | | |
|---|---|---|---|---|
| 2014/0358890 | A1* | 12/2014 | Chen | G06F 16/9535 |
| | | | | 707/710 |
| 2016/0171071 | A1* | 6/2016 | Beisiegel | G06F 16/2228 |
| | | | | 707/715 |
| 2017/0272485 | A1* | 9/2017 | Gordon | H04N 21/8586 |
| 2021/0192281 | A1* | 6/2021 | Deshpande | G06F 16/22 |
| 2021/0294781 | A1* | 9/2021 | Fernández Musoles | |
| | | | | G06F 16/367 |
| 2022/0093088 | A1* | 3/2022 | Rangarajan Sridhar | |
| | | | | G06F 16/338 |
| 2022/0156331 | A1* | 5/2022 | Milligan | G06F 16/907 |
| 2022/0207038 | A1* | 6/2022 | Cenciotti | G06F 18/214 |
| 2022/0414130 | A1* | 12/2022 | Master Ben-Dor | G06F 16/683 |
| 2023/0222117 | A1* | 7/2023 | Garg | G06F 16/242 |
| | | | | 707/769 |
| 2023/0252224 | A1* | 8/2023 | Tran | G06F 40/56 |
| | | | | 715/256 |
| 2023/0252233 | A1* | 8/2023 | Gutierrez | G06F 40/20 |
| | | | | 704/9 |
| 2024/0256840 | A1* | 8/2024 | Song | G06N 3/045 |
| 2024/0289361 | A1* | 8/2024 | Batina | G06F 16/3328 |
| 2024/0422201 | A1* | 12/2024 | Bruce | H04L 63/0428 |
| 2025/0175523 | A1* | 5/2025 | Long | G06F 16/137 |

* cited by examiner

Begin

Combine query strings into a representation of the query    *551*

Generate vector from query representation    *552*

Map generated vector to one or more vector shards of index    *553*

End

CONSTRUCTING A SEARCH INDEX BASED ON AN AUTOMATICALLY-SELECTED SET OF DOCUMENT PROPERTIES

CROSS-REFERENCE TO RELATED APPLICATIONS

This application claims the benefit of U.S. Provisional Patent Application No. 63/633,411, entitled OPERATING IN A CONTENT DELIVERY NETWORK A DISTRIBUTED SEARCH INDEX BASED AN AUTOMATICALLY-SELECTED SET OF DOCUMENT PROPERTIES, filed on Apr. 12, 2024, which is hereby incorporated by reference in its entirety.

This application is related to the following applications, each of which is hereby incorporated by reference in its entirety: U.S. patent application Ser. No. 18/359,596, filed Jul. 26, 2023; U.S. patent application Ser. No. 18/359,600, filed Jul. 26, 2023; U.S. patent application Ser. No. 18/488, 827, filed Oct. 17, 2023; U.S. Patent Application No. 63/619, 610, filed Jan. 10, 2024; and U.S. patent application Ser. No. 18/426,165, filed Jan. 29, 2024.

In cases where the present application conflicts with a document incorporated herein by reference, the present application controls.

BACKGROUND

Search involves identifying documents in a corpus—such as webpage available via the internet—that satisfy a query. In some cases, the documents in the corpus contain multiple fields, and a query may contain query strings each specified for a different one of these fields.

Search is conventionally performed by constructing a monolithic index for the corpus that is stored on a search server. The search server receives queries from client devices, uses the index to generate a query result for each, and responds with that query result.

DETAILED DESCRIPTION

Figure 1:
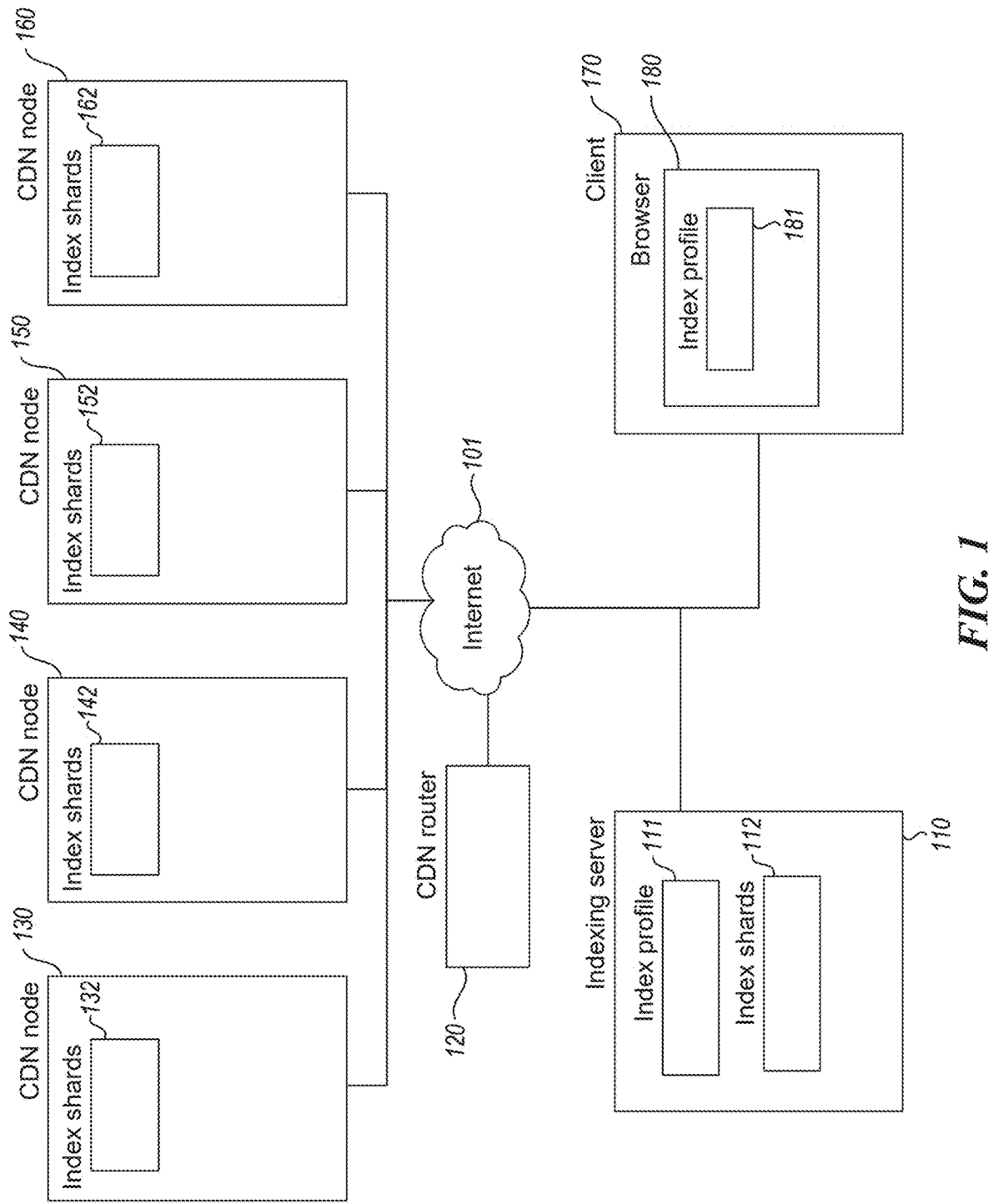
FIG. 1 is a network diagram showing an environment in which the facility operates in some embodiments.

The inventors have recognized significant disadvantages in the conventional approach to performing search. In particular, queries processed by a query server can have significant latency, high processing cost, and difficulty in scaling to higher volumes of queries.

In response to recognizing these disadvantages, the inventors have conceived and reduced to practice a software and/or hardware facility for operating a distributed search index in a content delivery network ("the facility").

In some embodiments, the facility distributes its search engine via a content delivery network ("CDN") that is made up of a significant number of geographically-distributed nodes that are in some cases strategically placed to be close to significant populations of users, either in terms of geographic distance or in terms of network connectivity. When a user submits a request to the CDN, the CDN routes it to the best CDN node to satisfy the request. Thus, without having to establish, maintain, or operate these geographically-distributed nodes, the operator of the facility is able to make its search index available to users with the low network latency, failure recovery capabilities, and ability to scale to increasing demand that are all inherent in CDNs.

In some embodiments, the facility processes a query generated on a client device against its search index in a CDN node where the index is stored, such as one of the CDN nodes where the index is stored that is judged to be closest to the client device in some sense. In some embodiments, the facility causes the client device to download the index to the client from a CDN node where the index is stored, and processes the query against the index in the client. In these embodiments, the index or parts of it can be cached on the client, such as in the client's browser cache, for use without re-downloading to resolve future queries.

In some embodiments, the facility constructs its index in a segmented, or "sharded" fashion, such that many queries can be processed using only a small subset of the shards that make up the index. In some embodiments, each shard relates to a single indexed field.

In some embodiments, the facility constructs the index by creating an empty index tree for each indexed field, then looping through the documents of the corpus, and, for each indexed field, adding each term appearing in the indexed field of the document to the appropriate position in the field's index tree together with the document's id. In various embodiments, the query terms into which the facility decomposes each query strand are words, phrases, word roots, word stems, etc. After an index tree is built for all of the documents of the corpus for each indexed field, the facility divides each of these trees into subtrees each no larger than a maximum subtree size. The facility then packages these subtrees each into their own shard, in some embodiments as a JavaScript routine that takes a query term as an argument and traverses an index subtree statically assigned inside the routine to locate the term and note the associated document ids. Each shard is named in a way that identifies the index (such as by corpus and version), the indexed field that it covers, and the position of its subtree among the subtrees created for the index field. In some embodiments, rather than subdividing a field's index tree after its construction is complete, the facility splits it into subtrees over the course of its construction each time a subtree's size exceeds the maximum size, or initially creates it to have its ultimate number of subtrees.

The facility takes two further actions to make the index usable: (1) it publishes the shards to a CDN, and (2) it distributes to or makes retrievable by search clients a profile of the index, including, for example, the name of the corpus, version of the index, and a schema specifying for each indexed field its name, data type, and number of shards.

The client uses the index metadata to formulate a query against the index. In particular, it uses the schema to receive query strings for one or more fields, such as from a user. For each term in each query string, it uses hashing techniques to identify one or more shards for the field that contain the subtrees in which the term can be found, builds the filenames for those shards, and dispatches a request to the CDN for each filename with the corresponding query term.

In some embodiments, the request is an execute request that instructs the CDN node in which the named shard is resident to load the shard if it is not already resident in working memory, execute it against the argument query term, and return the document ids specified by the node at the shard's subtree that matches that term. In some embodiments, the request is a retrieve request that instructs the CDN node to return the named shard; when the shard is returned, the client executes the shard against the query term. (In the case of retrieve requests, the shards of an index accumulate in the client's browser cache over time, reducing CDN invocations and associated latency for future queries.) The client then merges the document id lists produced by the executed shards to construct and display the query result.

In some embodiments, rather than dispatching individual shard requests for a query from the client, the client sends a single execute request to the CDN for a query dispatch routine that performs this task in the CDN. In some embodiments, the facility issues artificial requests to some or all of the CDN nodes for some or all of the index's shards to ensure that they are retained in working memory, so that the satisfaction of substantive shard requests is not delayed by loading them from persistent storage. In some embodiments, the facility sends these artificial requests to the CDN from a routine that the facility executes in the CDN.

In some embodiments, the facility provides hooks to invoke custom routines at points during the construction of the index and/or processing queries, such as those supplied by or developed for a customer for which the index is constructed and operated. In various embodiments, the facility provides these hooks at points such as before tokenization, after tokenization, before indexing, before search, before insertion in results, and after insertion in results. In some embodiments, the facility enables a custom tokenizer to be substituted for the facility's default tokenizer.

In some embodiments, the facility constructs, distributes, and applies the index in order to perform vector search over the corpus of documents. For each document of the corpus, the facility forms a vector—i.e., an ordered series of a fixed number of values—characterizing the document. The facility constructs a number of shards collectively making up a vector component of the index—"vector shards." Each vector shard of the index contains a subset of the mappings between the vector formed by the facility for a document and that document's document id. Each of these vector shards contains code for comparing a vectorized version of a current query to the vectors characterizing documents stored in the shard, to identify those vectors characterizing documents that are within a threshold level of similarity to the vector representation of the query, and return the corresponding document ids. In various embodiments, the index produced, distributed, and applied by the facility includes both a vector component and an attribute or field value component; only an attribute component; or only a vector component.

In some embodiments, the facility automatically selects properties of the documents of the corpus to be the subject of the index that it generates. The facility accesses a full list of the properties for which documents of the corpus may contain contents. In some embodiments, the facility itself automatically derives the accessed full list of properties from one or more sample documents. The facility subjects the full list of properties to a machine learning mechanism to obtain a list of automatically selected properties that are proposed to be a basis for the index. In various embodiments, the machine learning mechanism takes a variety of forms, including a custom inference model, such as a neural network; or a large language model ("LLM"), coupled with an appropriate prompt. In some embodiments, rather than determining the full list of properties from one or more sample documents as an intermediate step to selecting certain properties to be the subject of the index, the facility uses its machine learning mechanism to directly select properties for indexing from the contents of one or more sample documents. In some embodiments, some or all of the documents of the corpus are unstructured, such that property values are not explicitly delineated, and/or are not explicitly labeled with the corresponding property identities.

In some embodiments, the facility provides the list of automatically selected properties to a user, such as in a user interface, and gives the user the opportunity to approve or adjust the list of selected properties, by unselecting selected properties, or selecting unselected properties. In some embodiments, the facility constructs a schema to contain this ultimate list of selected properties. The facility uses the ultimate list of selected properties as a basis for generating its index. In some embodiments, the generated index contains one or more index trees for each of the selected properties. In some embodiments, the generated index contains a set of vectors, each vector corresponding to a single document and being generated by encoding a document representation constructed by the facility by concatenating the selected fields arranged in a consistent order.

In some embodiments, the facility itself trains the machine learning mechanism, in some cases including performing retraining or supplemental training using training observations obtained via user approval or adjustment of automatically selected property lists for particular document schemas; and/or by automatically modifying the prompt it uses to make requests of an LLM.

In various embodiments, the facility generates the index on the basis of the automatically selected properties in a variety of forms, including a sharded index suitable for deployment via a CDN, or a monolithic index that can be applied in a variety of computing environments, such as to perform search queries, operate a context-sensitive chatbot, perform queries against large language models ("LLMs"), etc.

By operating in some or all of the ways described above, when compared to conventional search techniques, the facility provides lower cost, greater speed, the ability to quickly and automatically scale to arbitrary demand levels, and the ability to automatically failover to redundant resources hardware. In particular, the facility's use of CDNs takes advantage of generally lower pricing for executing code there than in other cloud or dedicated server contexts; the facility's execution of search on the client is accomplished with computing cycles that have no marginal pecuniary cost; small network latency to the closest CDN node; CDNs' innate ability to scale quickly, automatically, and sometimes predictively, both to total load and demand from particular geographic or network locations; and CDNs' innate ability to fail around inoperative CDN nodes.

Further, for at least some of the domains and scenarios discussed herein, the processes described herein as being performed automatically by a computing system cannot practically be performed in the human mind, for reasons that include that the starting data, intermediate state(s), and ending data are too voluminous and/or poorly organized for human access and processing, and/or are a form not perceivable and/or expressible by the human mind; the involved data manipulation operations and/or subprocesses are too complex, and/or too different from typical human mental operations; required response times are too short to be satisfied by human performance; etc. As one example, the human mind cannot practically operate a content delivery network, nor make network-borne requests of a content delivery network. Additionally, any attempt to perform many of the processes claimed herein manually would result in search latency levels far too large to be fairly considered practical.

FIG. 1 is a network diagram showing an environment in which the facility operates in some embodiments. An indexing server 110 accesses a corpus of documents (not shown) for which an index is to be created and used to satisfy queries, such as via the Internet 101. Each document in the corpus is identified by a document identifier, which can be used to retrieve it. As is discussed in greater detail below, the indexing server generates an index for the corpus made up of an index profile 111 containing metadata for the index, as well as multiple index shards 112, each containing a subtree of the index that collectively make up the index. In order to activate the index, the facility publishes the shards of the index 112 to a content delivery network (CDN). In various embodiments, the CDN is the Alibaba Cloud CDN, the Cloudflare CDN, the Baluga CDN, the Fastly CDN, the Amazon Cloud Front CDN, or CDNs from a variety of other providers. While the facility typically performs only a single publishing request for each of the index shards, the effect of the publishing is to distribute the index shards to multiple nodes 130, 140, 150, and 160 of the CDN, based on a process managed and operated automatically by the CDN.

Activation of the index may also involve distribution of the index profile to a number of search client devices 170, such as client devices running a browser 180. When a user of the client inputs a query against the index, the facility's code on the client identifies a subset of the shards that are implicated by the query, and sends requests to the CDN for these identified shards, via a router 120 of the CDN. Each request is for a particular shard of the index corresponding to a particular indexed field, and specifies a query term being searched for in that field. The router redirects each request to the CDN node best-equipped to satisfy the request, in that it stores a copy of or link to the index shard, it has a short and/or inexpensive network path to the client, it is operating, it is underutilized or at least not overutilized, it has a lower pecuniary cost, etc. In resolving each of these redirected CDN requests, the target CDN node loads the identified index shard into working memory if it is not already resident there, and executes the shard's JavaScript and/or WebAssembly code to traverse the contained subtree in search of the query term identified by the request. The CDN returns from this invocation to the client with a list of the document IDs of documents identified with the term by the shard's subtree. On the client, the facility merges the list of document IDs returned from different shards of the index for the query, and uses this merged list to generate a query result.

Figure 2:
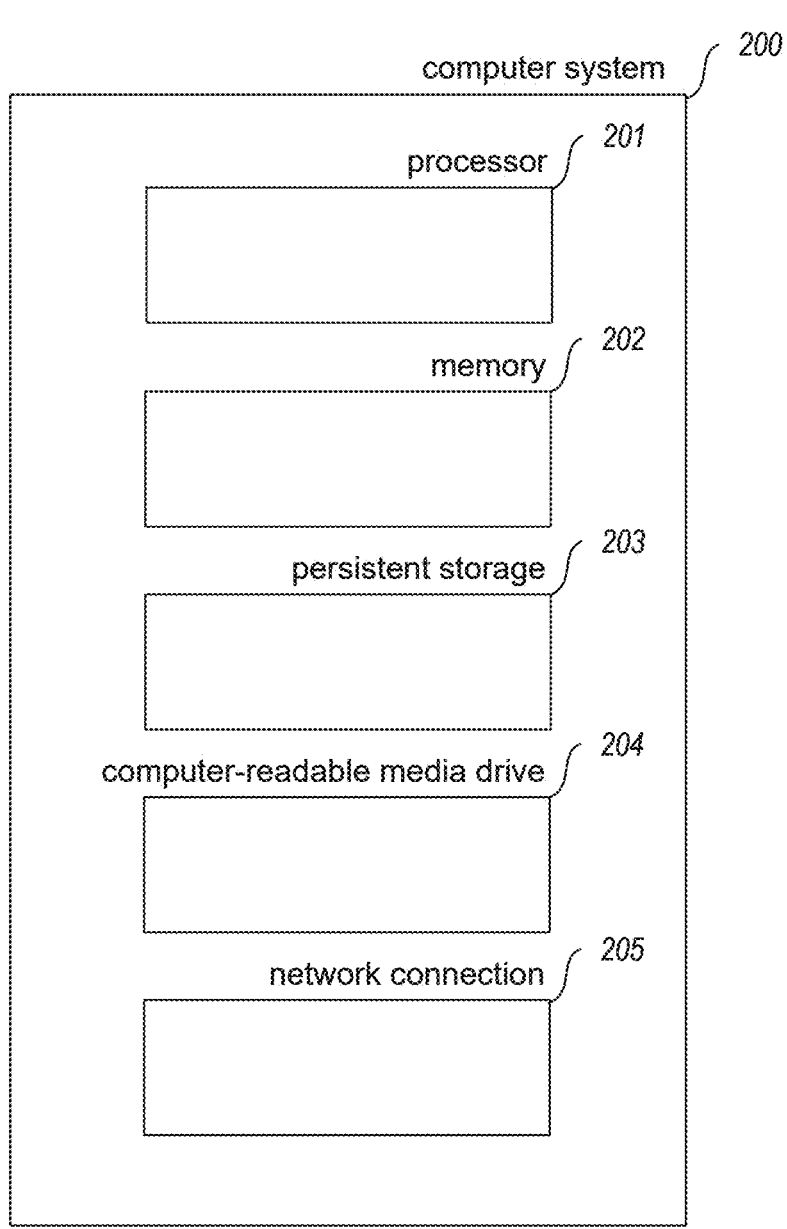
FIG. 2 is a block diagram showing some of the components typically incorporated in at least some of the computer systems and other devices on which the facility operates.

FIG. 2 is a block diagram showing some of the components typically incorporated in at least some of the computer systems and other devices on which the facility operates, including those shown in FIG. 1. In various embodiments, these computer systems and other devices 200 can include server computer systems, cloud computing platforms or virtual machines in other configurations, desktop computer systems, laptop computer systems, netbooks, mobile phones, personal digital assistants, televisions, cameras, automobile computers, electronic media players, etc. In various embodiments, the computer systems and devices include zero or more of each of the following: a processor 201 for executing computer programs and/or training or applying machine learning models, such as a CPU, GPU, TPU, NNP, FPGA, or ASIC; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. None of the components 201-205 shown in FIG. 2 and discussed above constitutes a data signal per se. While computer systems configured as described above are typically used to support the operation of the facility, those skilled in the art will appreciate that the facility may be implemented using devices of various types and configurations, and having various components.

Figure 3A:
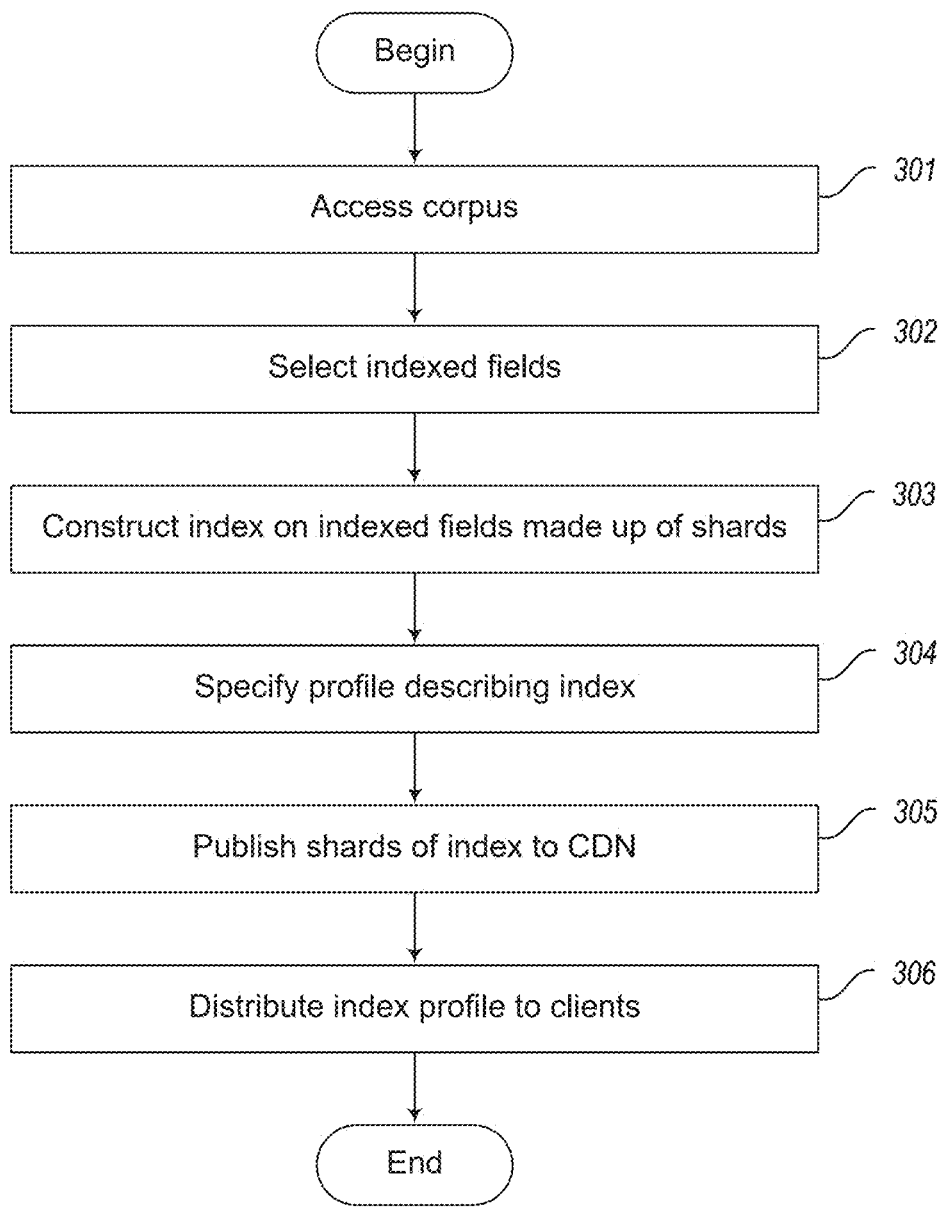
FIG. 3A is a flow diagram showing a process performed by the facility in some embodiments to construct an index for a corpus of documents.

FIG. 3A is a flow diagram showing a process performed by the facility in some embodiments to construct an index for a corpus of documents. In act 301, the facility accesses a corpus identified by the customer for which the index is being constructed. In some embodiments, after act 301, the facility executes a hooked routine that can adjust the contents of the accessed corpus for indexing, such as by adding or removing documents, adding or removing individual fields for some or all of the documents, modifying the contents of fields for some or all of the documents, etc. In act 302, the facility selects fields of the documents in the corpus that are to be indexed, so that queries against the index can find query terms that occur within these fields in some of the documents of the corpus. In various embodiments, the facility causes the index fields to be selected automatically, manually, or by a combination of automatic and manual efforts. In one example, for a corpus in which each document relates to a different person, the facility identifies a textual last name field, a numerical age field, and a textual biography field as the indexed fields.

In some embodiments, instead of or in addition to performing act 303 to create attribute value shards for inclusion in the index, the facility performs a process of creating vector shards for the index.

Figure 3B:
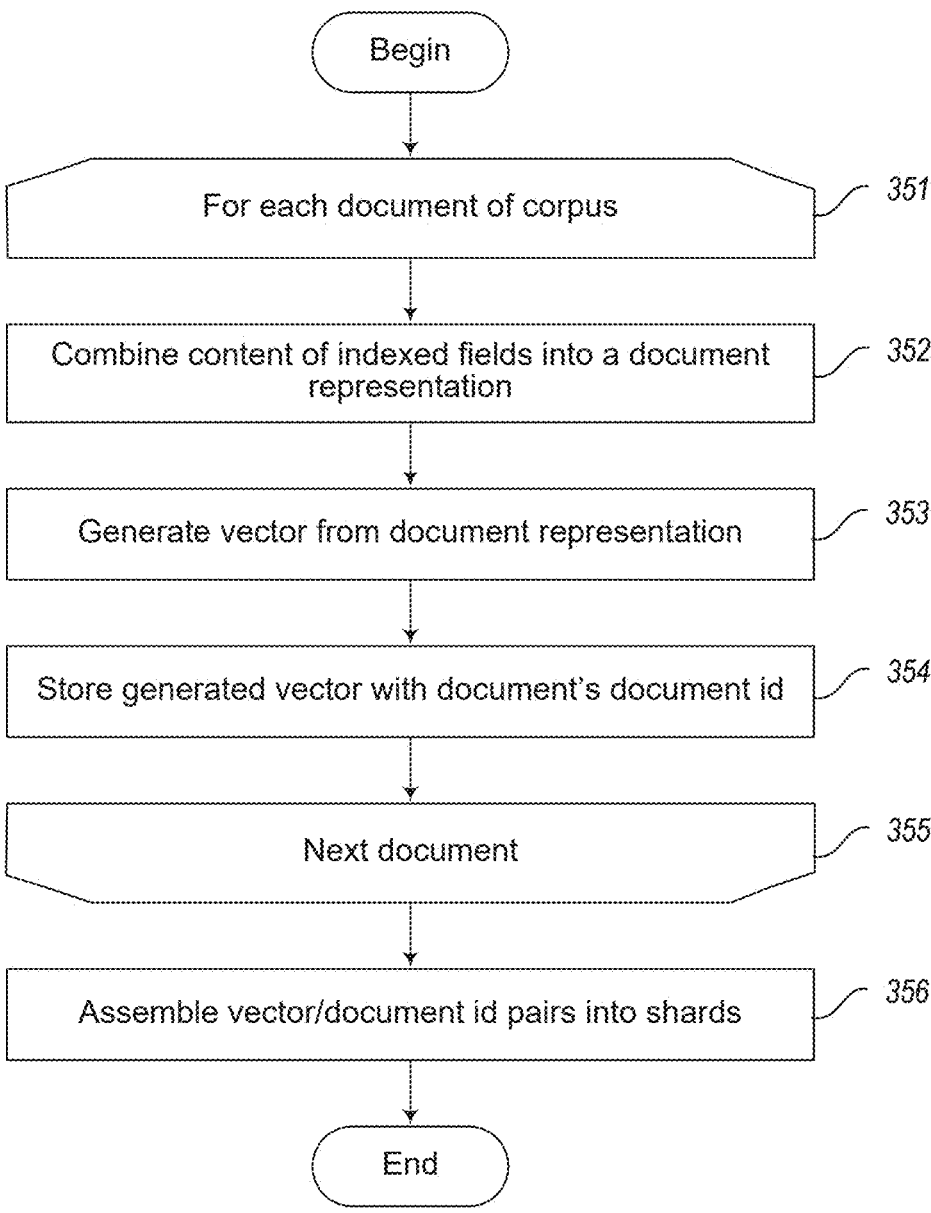
FIG. 3B is a flow diagram showing a process performed by the facility in some embodiments to construct vector shards for the index.

FIG. 3B is a flow diagram showing a process performed by the facility in some embodiments to construct vector shards for the index. In acts 351-355, the facility loops through each document of the corpus accessed in act 301. In act 352, the facility combines the contents of some or all of the indexed fields in the document into a representation of the document. In some embodiments, act 352 involves concatenating the contents of these indexed fields. For example, for a particular document where the last name field contains "Anderson", the age is "44", and the biography is "the subject is a painter", the facility generates a document representation of "Anderson 44 the subject is a painter".

In act 353, the facility generates a vector from the document representation obtained in act 352. In some embodiments, the facility generates this vector in a manner that seeks to represent among the ordered series of values of the vector the semantic meaning of the text in the document representation, such that vectors generated from text strings that, despite being literally significantly different, have a similar semantic meaning contain similar sequences of values. In some embodiments, the facility accomplishes this by subjecting the document representation to a semantic embedding process, such as is described in Vector Search in Azure Cognitive Search, available at learn.microsoft.com/en-us/azure/search/vector-search-overview; and/or in Understand Embeddings in Azure OpenAI Service, available at learn.microsoft.com/en-us/azure/ai-services/openai/concepts/understand-embeddings. These documents are hereby incorporated by reference in their entirety.

In act 354, the facility stores the vector generated in act 353 with the document id that identities the current document. In act 355, if additional documents of the corpus remain to be processed, then the facility continues in act 351 to process the next document, else the facility continues in act 356.

In act 356, the facility assembles the pairs each containing one of the generated vectors and the document id that identifies the document from which the vector was generated into vector shards. Each such vector shard includes a table in which each row is one of these pairs. Each of these vectors also includes code for traversing the table and comparing the vector of each row to a vector representing a present search query. In this comparison, the facility determines whether the two compared vectors are similar enough to constitute a vector search hit. In some embodiments, the facility performs the similarity analysis by applying a cosine similarity measure described in the documents referenced above, and comparing the value of this cosine similarity metric to a cosine similarity value threshold configurable by the designer, implementer, and/or operator of the facility. In some embodiments, the facility organizes the vector/document id pairs into shards to group together in the same shards the vectors that are most similar, to facilitate the satisfaction of a query using fewer than all of the vector shards. For those vectors identified as adequately similar to the vector for the query, the code in the shard returns their document ids for inclusion in the query result. After act 356, this process concludes.

Those skilled in the art will appreciate that the acts shown in FIG. 3B and in each of the flow diagrams discussed herein may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Returning to FIG. 3A, in act 303, the facility constructs an index on the fields of the corpus selected in act 302 as indexed fields. The constructed index is made up of shards. In some embodiments, the facility constructs the index by creating an empty index tree for each indexed field, then looping through the documents of the corpus, and, for each indexed field, adding each term appearing in the indexed field of the document to the appropriate position in the field's index tree together with the document's id. In some embodiments, after an index tree is built for all of the documents of the corpus for each indexed field, the facility divides each of these trees into subtrees each no larger than a maximum subtree size.

In some embodiments, where the size of the total index tree can be predicted for a field before its construction, the facility creates at the outset a number of subtrees for the field that will collectively be adequate—in light of the maximum size of a shard that can be accommodated in the CDN's routine execution environment to accommodate an overall tree for the field of that size. The facility then uses a round-robin hashing algorithm to select which of these subtrees for the field will contain each term that occurs in the field in at least one document of the corpus. In some embodiments, such as embodiments in which it is not clear how large the overall search tree will be for the field, the facility begins by creating a single tree for the field, which it progressively splits into more and more subtrees as the maximum subtree size is reached. In some embodiments, for this hashing approach, the facility uses determinative consistent hashing to select among the subtrees to contain a particular term present in the field in at least one of the documents of the corpus.

Figure 4:
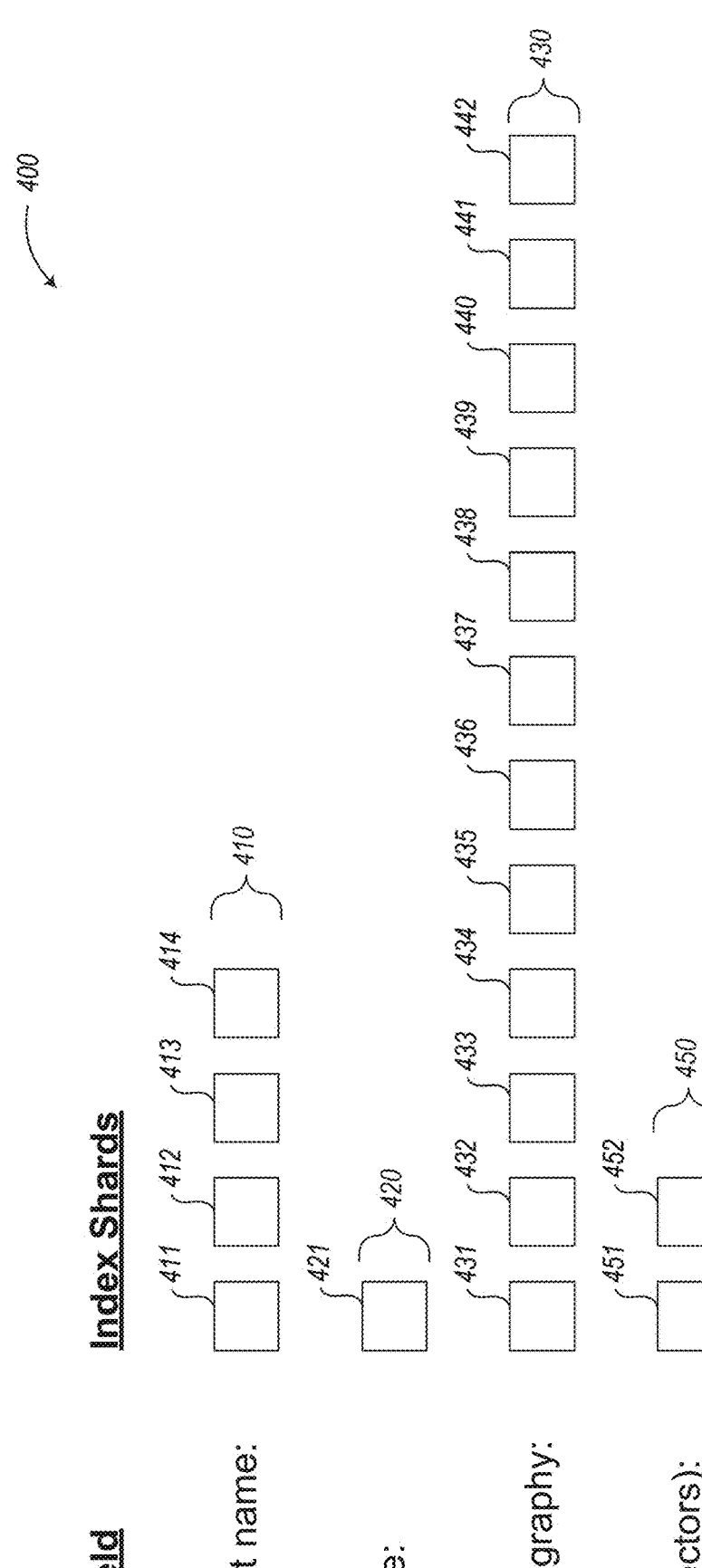
FIG. 4 is a data structure diagram showing the shards that make up a sample index generated by the facility.

The facility then packages these subtrees each into their own shard, in some embodiments as a JavaScript routine that takes a query term as an argument and traverses an index subtree statically assigned inside the routine to locate the term and note the associated document ids. Each shard is named in a way that identified the index (such as by corpus and index version, in various embodiments an ordinal version number or a date and/or the time at which the index is created), the indexed field that it covers, and the position of its subtree among the subtrees created for the index field. The index shards created by the facility for the example index are shown in FIG. 4 and discussed below. In some embodiments, after act 303, the facility executes a hooked routine to modify the constructed index before its publication.

In act 304, the facility specifies a profile describing an index. In some embodiments, this index profile contains information such as the customer for which the index was generated; the corpus against which the index was generated; a version of the index, such as an ordinal version number or a creation date and/or time; and a schema that identifies each indexed field, such as by field name or field number, and provides the data type of the field, and the number of shards created for the field. In some embodiments, the schema further specifies for each field the hashing approach used to select the appropriate charge for a particular term. In some embodiments, the hashing approach is implied based upon the data type of the field, or uniform across all data types. Table 1 below shows the schema included in the indexed profile in the example.

TABLE 1

| Field | Data Type | Number of Shards |
|---|---|---|
| Last Name | String | 4 |
| Age | Number | 1 |
| Biography | String | 12 |
| Vector | 2 | |

To make the index usable to perform queries, the facility first publishes the shards to a CDN in act 305. In some embodiments, the facility selects a CDN capable of executing JavaScript routines or other code in its nodes, such as using Edge Routines on the Alibaba Cloud CDN, Cloudflare Workers, Beluga CDN dynamic content, Compute@Edge by the Fastly CDN, or Amazon CloudFront Functions or Lambda@Edge Functions. For example, in some embodiments, the facility generates each shard to execute in the CloudflareWorkers environment as described by How Workers Works, available at developers.cloudflare.com/workers/learning/how-workers-works, which is hereby incorporated by reference in its entirety. In cases where a document incorporated by reference herein conflicts with this application, this application controls.

In act 306, the facility distributes the index profile specified in act 304 to clients, such as by transmitting it autonomously to clients or making it available for retrieval by clients. After act 306, this process concludes.

FIG. 4 is a data structure diagram showing the shards that make up a sample index generated by the facility. Within the index 400, four shards 411-414 contain subtrees of the index tree for the last name index field 410. One shard 421 contains subtree of the index tree for the age index field 420. Twelve shards 431-442 contain subtrees of the index tree for the biography index field 430. Two shards 451 and 452 contain vectors for supporting vector search by the facility. In some embodiments, the number of shards established by the facility for a field depends on the size of a field, its data type, and/or the diversity of its contents across documents of the corpus.

Figure 5A:
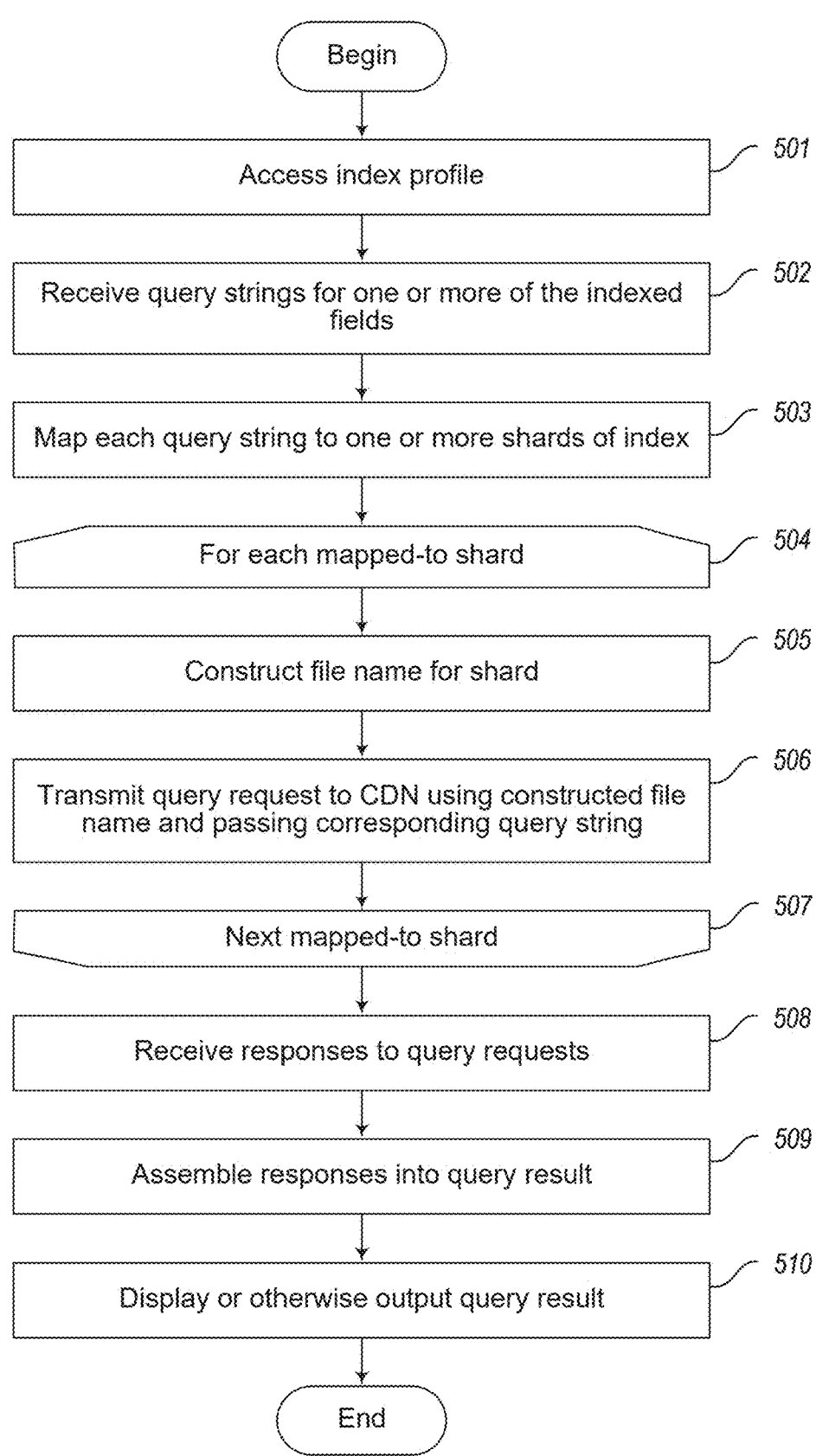
FIG. 5A is a flow diagram showing a process performed by the facility in some embodiments to perform a query.

FIG. 5A is a flow diagram showing a process performed by the facility in some embodiments to perform a query. In act 501, the facility accesses the index profile for the index. In some embodiments, the facility does so after a user of the client selects among different indices whose profiles have been received by the client. In act 502, the facility receives from a user of the client query strings for each of one or more of the index fields identified by the index profile. For example, in some embodiments the facility displays, for each indexed field, a textbox control into which the user can type a query string for the field. In some embodiments, the facility type-checks the query strings to ensure that they are consistent with the type of each field, and displays an error for any query strings that are inconsistent with the type of the field into whose textbox it was typed. In the example, the facility receives the following query:

TABLE 2

| Field | Query String |
|---|---|
| Last Name | Ambrose |
| Age | |
| Biography | Master's Degree |

In act 503, the facility maps each query string to one or more shards of the index. In some embodiments, the facility performs a particular process with respect to each of the indexed fields for which a query string was received. In particular, the facility uses the number of shards for the field and the type of the field to map from the query term to the shard in which the query term is expected to be found. In the example, the facility maps the query string "Ambrose" in the last name field to a single one of the last name index shards, and maps the query string "master's degree" for the biography field to two of the index shards with the biograph field, each corresponding to a different one of the two words of the phrase "master's degree."

In some embodiments, either in place of or in addition to act 503, the facility performs a process that conducts vector search for documents containing text having a meaning that is similar to that of the query.

Figure 5B:
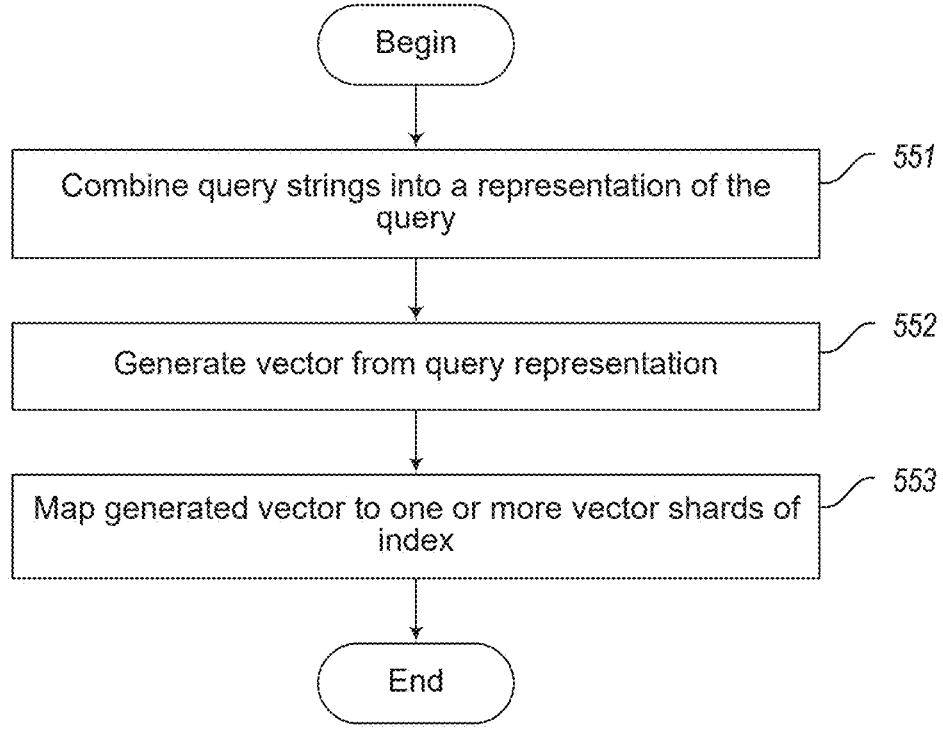
FIG. 5B is a flow diagram showing a process performed by the facility in some embodiments to perform a query using vector search.

FIG. 5B is a flow diagram showing a process performed by the facility in some embodiments to perform a query using vector search. In act 551, the facility combines the query strings received in act 502 into a representation of the query, such as by concatenating them. In act 552, the facility generates a vector from the query representation obtained in act 551. In some embodiments, the facility generates this vector in act 552 in the same or similar way as the vectors generated for the documents of the corpus in act 503 shown in FIG. 3B. In act 553, the facility maps the vector generated in act 552 for the query to one or more vector shards of the index. In some embodiments, the facility simply maps the vector to all of the vector shards of the index. In some embodiments, the facility selectively maps the vector to a proper subset of the vector shards of the index that are determined by the facility to contain the most similar to the vector generated for the query. After act 553, this process concludes.

Returning to FIG. 5A, in acts 504-507, the facility loops through each shard that is mapped to in act 503. In act 505, the facility constructs the name for the shard. In some embodiments, the name is constructed by concatenating groups of one or more characters, each representing one of the following pieces of information: the identity of the facility and/or its operator; the identity of a customer for which the index is being constructed; the identity of the corpus for which the index is being constructed; a version or creation time of the index to distinguish it from other indices generated by the facility for this corpus at earlier times; the identity of the field; and the number of the shard among the shards created for this field. In act 506, the facility transmits a query request to the CDN using the file name constructed in act 505, and passing the query term that was mapped to the shard, or, in some embodiments, the entire query string for the field. In act 507, if additional mapped-to shards remain to be processed, then the facility continues in act 504 to process the next mapped-to shard, else the facility continues in act 508. In the example, the facility transmits three requests to the CDN: a request for the shard that the last name Ambrose maps to, with that term; the shard for the biography field that the term master's maps to, with that term; and the shard for the biography field that the term degree maps to, with that term.

In act 508, the facility receives responses to the query request transmitted in act 506. In the example, the facility receives three responses from the CDN containing document ids identifying documents that have "Ambrose" in the last name field; those that have "masters" in the biography field; and those that have "degree" in the biography field. In some embodiments, after act 508, the facility executes a hooked routine that can modify the received responses to query requests.

In act 509, the facility assembles the responses received in act 508 into a query result. In some embodiments, this involves merging lists of document identifiers received in each of the responses into a master list of document identifiers, and retrieving biographical information about documents using their document identifiers. By merging the three document ID lists received in the example, the facility obtains a search result containing the documents that have Ambrose in the last name field, and masters and degree in the biography field.

In some embodiments, the facility performs the merging by using insertion sort in creating a master list of document identifiers from the per-term lists of document identifiers each generated by traversing a subtree with respect to a particular term. In some embodiments, the elements of the master list each have a count or other score that is augmented for each of the individual lists that the master list document identifier was on. At the end of this process, the facility can filter and/or sort the documents in the query result based upon the counters or other scores produced for the document ids in this process. In some embodiments, the list of document ids attached to each node of each shard subtree is stored in sort order—e.g., in increasing order of document id value, and thus document id per shard returned document id lists are each themselves in sort order. In some embodiments, the facility merges these lists by establishing a position pointer at the beginning of these individual document id lists, and advancing them in a coordinated way, so that the document id is monotonically increasing in the traversal across all of the individual lists as the facility generates the master list.

In some embodiments, after act 509, the facility executes a hooked routine that can modify the query result created in act 509. In act 510, the facility displays the query result created in act 509, or otherwise outputs it. After act 510, this process concludes.

Figure 6:
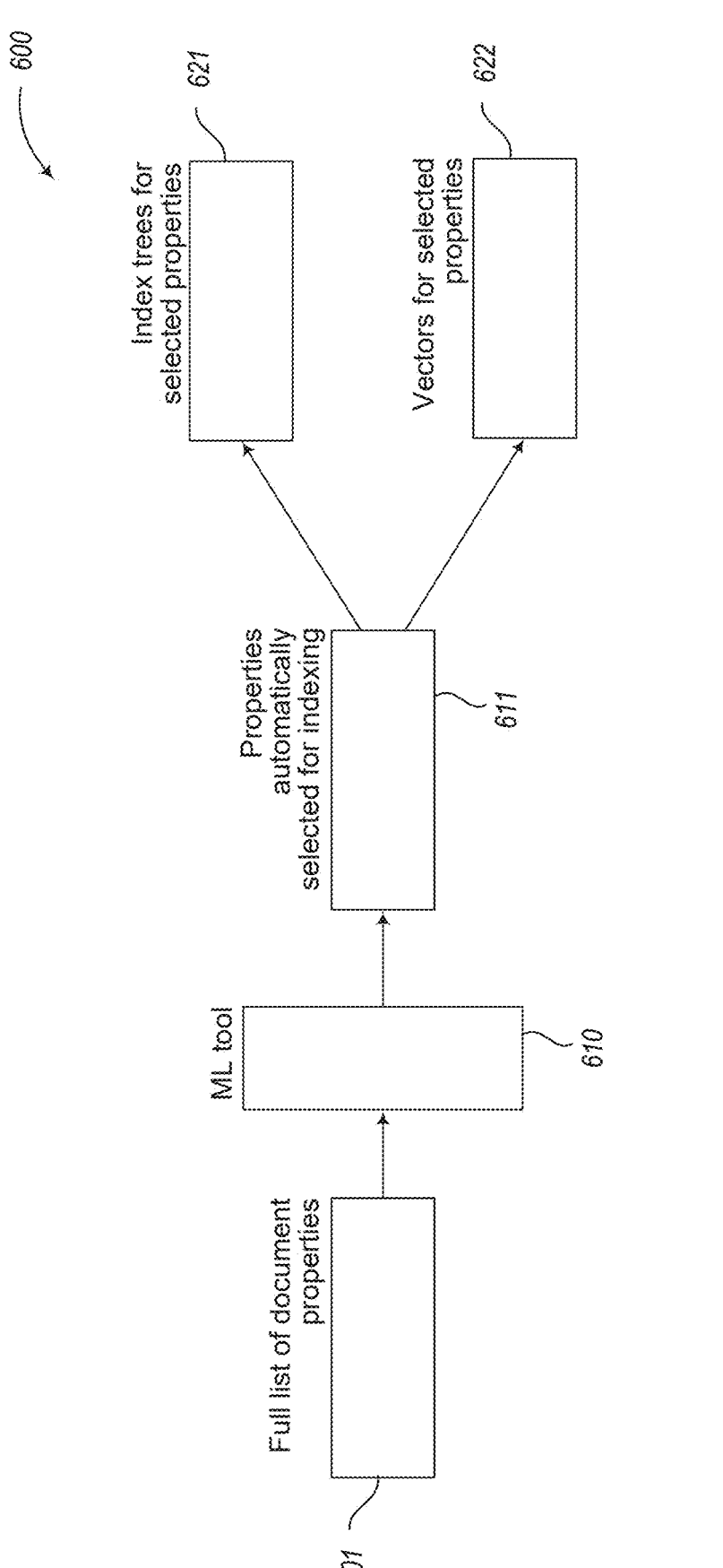
FIG. 6 is a data flow diagram showing the facility's production of an index on the corpus using automatically selected properties in some embodiments.
Figure 7:
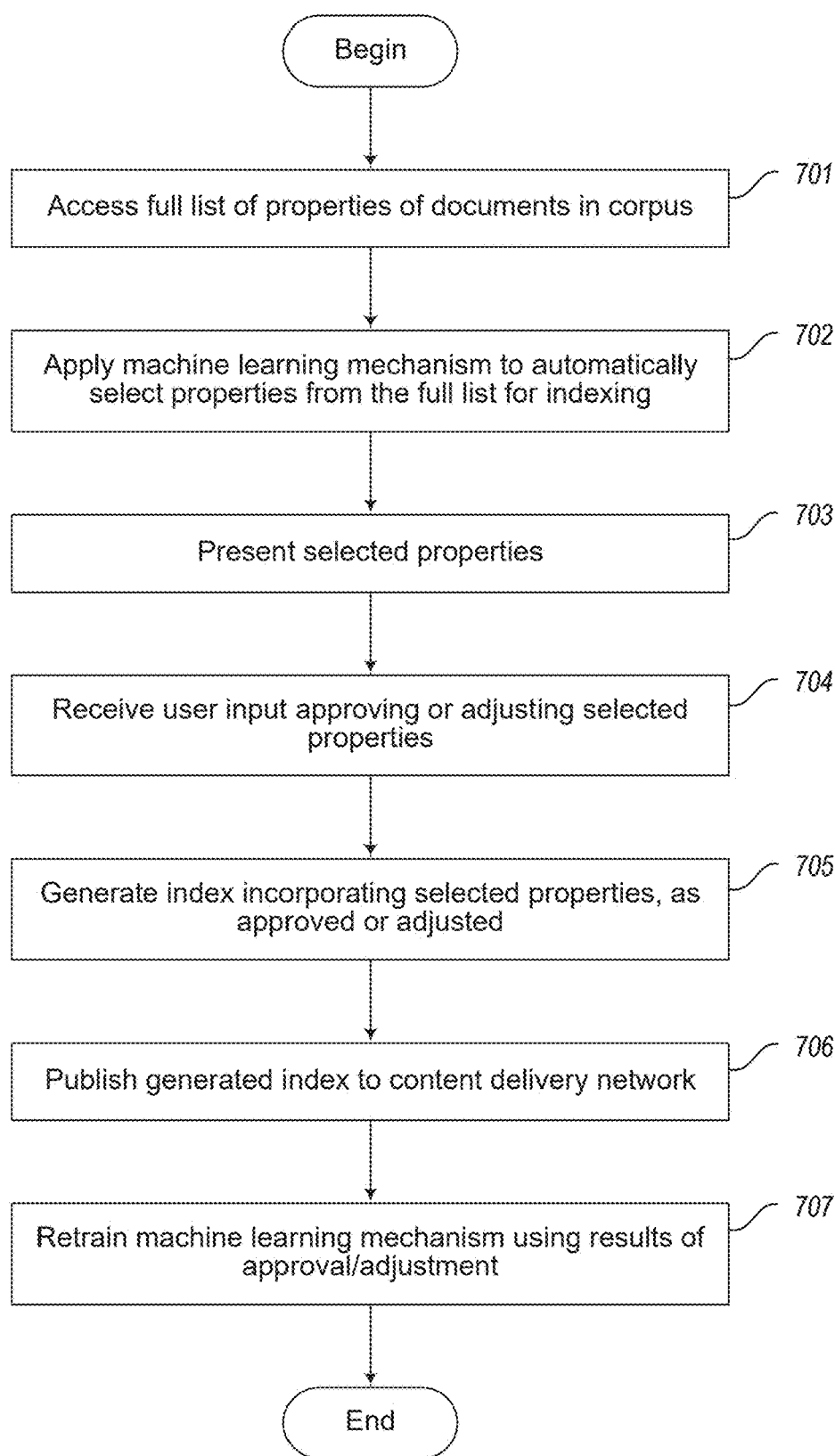
FIG. 7 is a flow diagram showing a process performed by the facility in some embodiments to automatically select properties for indexing and generate an index that includes them.
Figure 8:
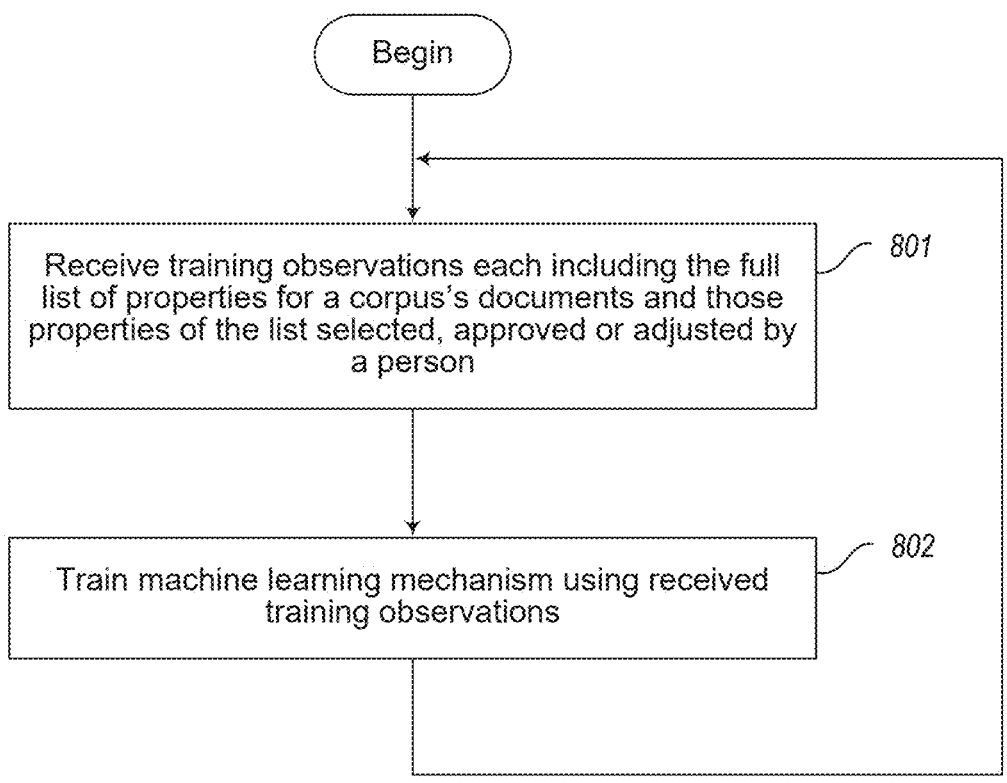
FIG. 8 is a flow diagram showing a process performed by the facility in some embodiments to retrain its machine learning mechanism.

FIGS. 6-8 discussed below relate to the facility's automatic selection of document properties to be the subject of the index that it generates for the corpus containing the documents where an explicit list of all of the properties of the documents in the corpus is available.

FIG. 6 is a data flow diagram showing the facility's production of an index on the corpus using automatically selected properties in some embodiments. In the depicted data flow 600, the facility accesses a list 601 of all of the properties of the documents in the corpus. In some embodiments, the schema further identifies a data type for each of these properties. The facility subjects this list of properties to a machine learning tool 610, such as a custom inference model, or a large language model to produce a list 611 of properties automatically selected by the machine learning tool for indexing. The facility in turn uses this list of selected properties as the basis for generating both index trees 621 and vectors 622 making up an index on the corpus.

FIG. 7 is a flow diagram showing a process performed by the facility in some embodiments to automatically select properties for indexing and generate an index that includes them. In act 701, the facility accesses a list of properties of the documents contained in the corpus. A sample full list of document properties for an example corpus—together with their data types—is shown below in Table 3.

TABLE 3

| Sample Full List of Document Properties | |
|---|---|
| 1 | id - number |
| 2 | title - string |
| 3 | author - string |
| 4 | rating - number |
| 5 | metadata:year - number |
| 6 | metadata:genre - string |
| 7 | metadata:favorite - boolean |
| 8 | metadata:characters - string |

In act 702, the facility applies a machine learning mechanism to automatically select properties from the full list accessed in act 701 for indexing. Table 4 below shows a sample result of performing the selection for the example corpus whose sample full list of properties is shown in Table 3.

TABLE 4

| Sample Property Selection Result | |
|---|---|
| 1 | title - string |
| 2 | author - string |
| 3 | rating - number |
| 4 | metadata:year - number |
| 5 | metadata:genre - string |
| 6 | metadata:favorite - boolean |

It can be seen by comparing Table 4 to Table 3 that the facility has selected for indexing six of the eight properties in the full list of properties. These selected properties are those that searching users are likely to want to either search on or filter on in exploring, analyzing, or digesting the documents of the corpus. It is unlikely that a searching user would want to search or filter on either of the two omitted properties: the document id property shown on line 1 of Table 3, nor the metadata: characters property shown on line 8 of Table 3.

In some embodiments, the machine learning mechanism used by the facility to perform the selection of act 702 is a custom inference model, such as a neural network.

In some embodiments, the facility performs the selection of act 702 using a large language model (LLM). Table 5 below contains a sample prompt submitted by the facility to the large language model-incorporating contents of one or more example documents of the corpus to be indexed—in order to request the LLM to generate the list of selected properties.

TABLE 5

| | Sample LLM Prompt |
|---|---|
| 1 | You're integrating a full-text search engine that needs a well |
| 2 | defined schema to work properly. We the |
| 3 | following object extrapolated from |
| 4 | \'${fileName}\': |
| 5 | \'\'\'json |
| 6 | ${exampleObject} |

TABLE 5-continued

| Sample LLM Prompt |
| --- |

```
 7  \'\'\'
 8
 9  We want to understand how the schema of the index \'${indexName}\'
10                          should be look like.
11  The schema should only contain searchable and filterable properties,
                            so the ones that people would likely
12                          search the most.
13
14  Which properties are the users likely to search more?
15
16  Let's take the following example.
17  Given the following input:
18
19  \'\'\'json
20  // INPUT
21  [
22    {
23      "id": "6fe0c1d7-1a78-4f83-8c4c-1e942e782f23",
24      "title": "The Lord of the Rings: The Fellowship of the Ring",
25      "author": "J. R. R. Tolkien",
26      "rating": 4.5,
27        "metadata": {
28        "year": 1954,
29        "genre": "Fantasy",
30          "favorite": true,
31          "characters": [
32          "Frodo Baggins",
33          "Gandalf",
            "Aragorn",
34          "Legolas"
35          "Gimli",
36        ],
37      }
38    }
39  ]
40  \'\'\'
41
42  The following schema would be a good fit:
43
44  \'\'\'json
45  {
46    "title": "string",
47    "author": "string",
48    "rating": "number",
49    "metadata": {
50      "year": "number",
51      "genre": "string",
52      "favorite": "boolean",
53    }
54  }
55  \'\'\'
56
57  THE ABOVE IS JUST AN EXAMPLE DO NOT CONSIDER IT AS THE CORRECT
58                          ANSWER.
59
    In the example:
60  - "title" and "author" are likely to be searched, so they should be
61                          included.
62  - "rating" is likely to be used as a filter, so it should be
63                          included.
64  - "metadata.year" might be useful to filter by year, so it should be
65                          included.
66  - "metadata.genre" might be useful to filter by genre, so it should
67                          be included.
68  - "metadata.favorite" might be useful to filter by favorite, so it
                            should be included.
    - "metadata. characters" is excluded as it contains extra information
69                              that is unique to this book and
70                              therefore not interesting for search.
71
72  If you believe people would only search into "title" and "author"
73                          properties, just put these properties.
74  If you believe people would filter by year, also add "year" to the
75                          properties, and so on.
76  NEVER INCLUDE "id", "uuid", "cuid" OR SIMILAR PROPERTIES, THEY'RE NOT
77                          SEARCHABLE.
78
79  Available types are "string", "number", "boolean", "string [ ]",
```

US 12,651,025 B2

TABLE 5-continued

Sample LLM Prompt

```
 80                     "number [ ]", "boolean [ ]".
 81  You can use nested fields if these are present in the original
 82                        document.
 83  Please consider to use at maximum 5 properties. Choose the most
 84                        important ones.
 85
 86  Numbers and booleans are not searchable, but need to be indexed to be
 87                        used as filters, if they make sense.
 88  Try to understand if people would need to use them for filter or
 89                        facets. If that's the case, include
 90                        them.
 91
 92  Reply with JUST A JSON, nothing more.
 93
 94  The JSON should be in the following format:
 95
 96  {
 97    "schema": { },
 98    "included": "The following properties have been included because
 99                        . . .",
        "excluded": "The following properties have been excluded because
                        . . ."
        }
100  The "schema" property should contain the schema you want to use.
101  The "included" property should contain the properties you included.
102                        Specify why you think they should be
103                        included.
104  The "excluded" property should contain the properties you excluded.
105                        Specify why you think they should be
106                        excluded.
```

It can be seen that the prompt contains contents of one sample document of the corpus to be indexed in lines 22-38. In various embodiments, the facility uses an LLM prompt that is different in a variety of ways from the sample prompt shown in Table 3. In some embodiments, over time, the facility automatically adapts the LLM prompt it is using to limit the adjustments made by editorial users to the lists of properties it selects. In some embodiments, the facility uses an LLM to automatically make these adjustments to the prompt.

In act 703, the facility presents the properties selected in act 702 to an editorial user. For example, in some embodiments, in this presentation, the facility displays a full list of document properties, with the automatically selected properties checked. In act 704, the facility receives user input either approving or adjusting the selected properties, such as by unchecking selected properties, and/or checking unselected properties. In act 705, as described elsewhere herein, the facility generates an index incorporating the selected properties as approved or adjusted in act 704. In act 706, the facility publishes the index generated in act 705 to a content delivery network as described elsewhere herein, for use in performing searches against the corpus. In act 707, the facility retrains the machine learning mechanism applied in act 702 using results of the approval or adjustment indicated by the user input received in act 704. After act 707, this process concludes.

FIG. 8 is a flow diagram showing a process performed by the facility in some embodiments to retrain its machine learning mechanism. In act 801, the facility receives training observations each including the full list of properties for a corpus and those properties of the list that were selected, approved, or adjusted by an editorial user or other person. In act 802, the facility trains the machine learning mechanism using the training observations received in act 801, such as via model retraining or supplemental training, or LLM prompt revision. After act 802, the facility continues in act 801.

Figure 9:
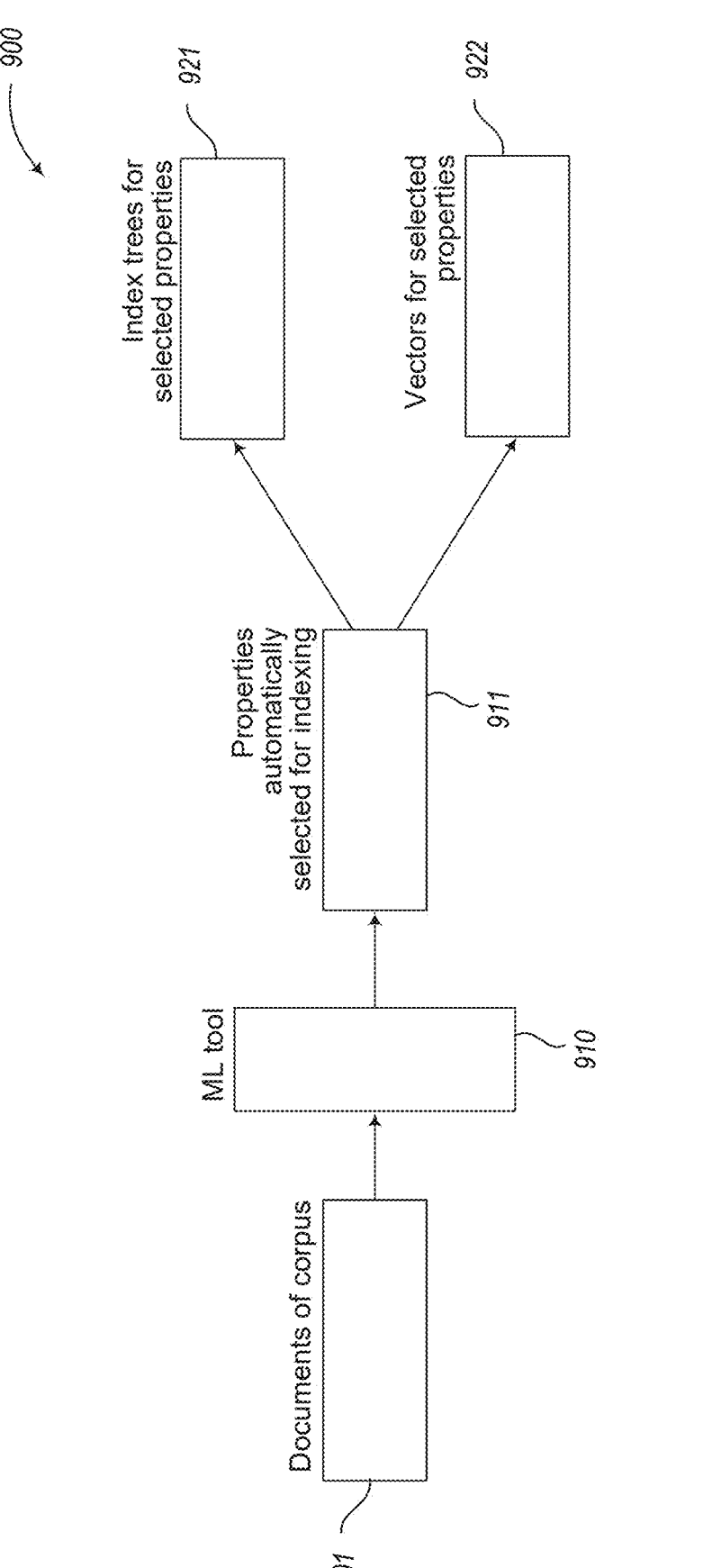
FIG. 9 is a data flow diagram showing the facility's production of an index on the corpus using automatically selected properties in some embodiments.
Figure 10:
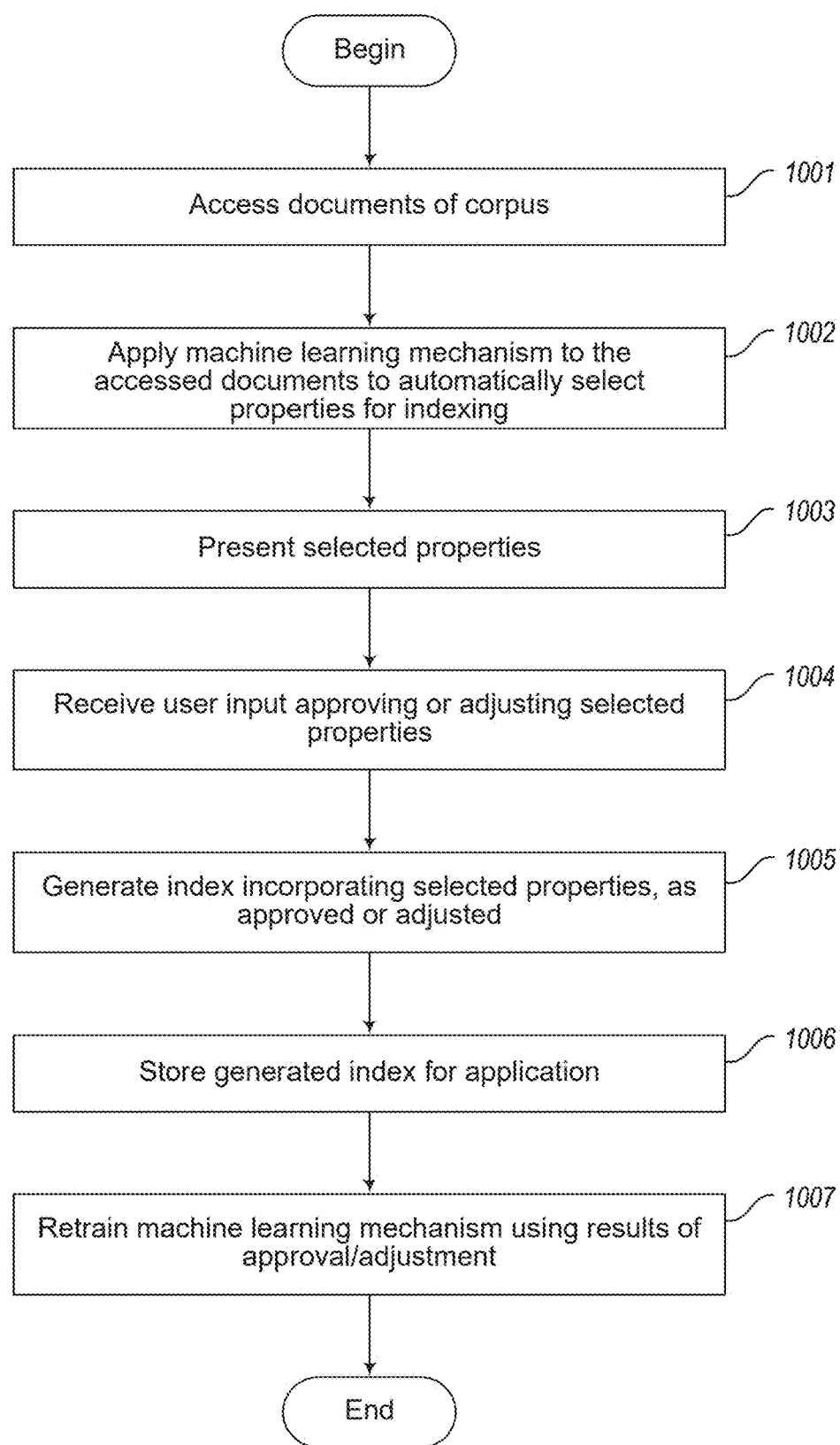
FIG. 10 is a flow diagram showing a process performed by the facility in some embodiments to automatically select properties for indexing and generate an index that includes them.
Figure 11:
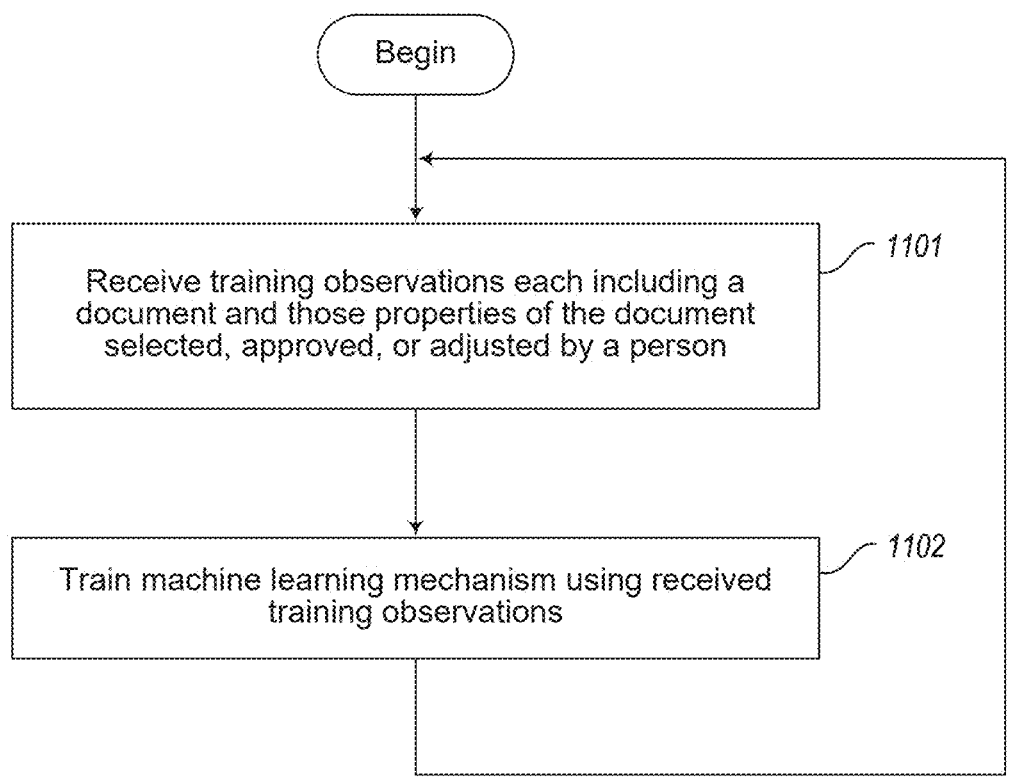
FIG. 11 is a flow diagram showing a process performed by the facility in some embodiments to retrain its machine learning mechanism.

FIGS. 9-11 discussed below relate to the facility's automatic selection of document properties to be the subject of the index that it generates for the corpus containing the documents where a complete list of the properties of the documents in the corpus is not available, and/or some or all of the documents of the corpus are in unstructured form.

FIG. 9 is a data flow diagram showing the facility's production of an index on the corpus using automatically selected properties in some embodiments. In the depicted data flow 900, the facility accesses the documents 901 in the corpus. The facility subjects the documents to a machine learning tool 910, such as a custom inference model, or a large language model to produce a list 911 of properties automatically selected by the machine learning tool for indexing. The facility in turn uses this list of selected properties as the basis for generating both index trees 921 and vectors 922 making up an index on the corpus.

FIG. 10 is a flow diagram showing a process performed by the facility in some embodiments to automatically select properties for indexing and generate an index that includes them. In act 1001, the facility accesses the documents contained in the corpus. In various embodiments, the documents are structured, semi-structured, unstructured, or a combination of these.

In act 1002, the facility applies a machine learning mechanism to automatically select properties for indexing. Table 6 below shows a sample result of performing the selection for an example corpus.

TABLE 6

Sample Property Selection Result

| 1 | title - string |
| 2 | author - string |
| 3 | rating - number |
| 4 | metadata:year - number |

TABLE 6-continued

| | Sample Property Selection Result |
|---|---|
| 5 | metadata:genre - string |
| 6 | metadata:favorite - boolean |

In some embodiments, the machine learning mechanism used by the facility to perform the selection of act 1002 is a custom inference model, such as a neural network. In some embodiments, the custom inference model is a transformer-based neural network. In some embodiments, the facility performs supervised learning to train the inference model, in which the model is provided with a set of training observations each made up of independent variables and dependent variables. The trained state of the network—made up of connection weights and node biases—is continuously adjusted to improve the model's accuracy in inferring the training observations' dependent variables from their independent variables. In this case, the training observations' independent variables are each a document, and the corresponding dependent variables are the properties of that document that should be indexed. In some embodiments, the facility employs a two-stage approach to generating the training observations used to train the model. In a first stage, a human editor creates or verifies a group of training observations of intermediate size, by ascertaining or verifying the properties that should be indexed for a number of documents that are representative of the documents to be indexed by the facility. In the second stage, the facility employs a large language model to generate a significantly larger group of synthetic training observations from the manually-generated training observations from the first phase. The facility then uses all of generated training observations in training the model.

In some embodiments, the facility performs the selection of act 1002 using a large language model (LLM). Table 7 below contains a sample prompt submitted by the facility to the large language model—incorporating contents of one or more example documents of the corpus to be indexed—in order to request the LLM to generate the list of selected properties.

TABLE 7

| | Sample LLM Prompt |
|---|---|
| 1 | ## Example Output |
| 2 | |
| 3 | Let's make an example. If you get the following documents: |
| 4 | |
| 5 | ```json |
| 6 | [ |
| 7 | { |
| 8 | "id": "123", |
| 9 | "title": "The Lord of the Rings", |
| 10 | "content": "The Lord of the Rings is a trilogy of epic fantasy |
| 11 | adventure films directed by Peter Jackson. . . ", |
| 12 | "published": 2001 |
| 13 | }, |
| 14 | { |
| 15 | "id": "456", |
| 16 | "title": "The Metamorphosis", |
| 17 | "content": "The Metamorphosis (German: Die Verwandlung), also |
| 18 | translated as The Transformation, is a novella by Franz Kafka |
| 19 | published in 1915..." |
| 20 | "published": 1915 |
| 21 | } |
| 22 | ] |
| 23 | ``` |
| 24 | You should reply with the following JSON: |
| 25 | |
| 26 | ```json |
| 27 | { |
| 28 | "properties": ["title", "content", "published"], |
| 29 | "includeKeys": ["published"], |
| 30 | "rename": { } |
| 31 | } |
| 32 | ``` |
| 33 | |
| 34 | So that the final concatenated string will look like: |
| 35 | |
| 36 | ```plaintext |
| 37 | The Metamorphosis. The Metamorphosis (German: Die Verwandlung), also |
| 38 | translated as The Transformation, is a novella by Franz Kafka |
| 39 | published in 1915... Published 1915. |
| 40 | ``` |
| 41 | |
| 42 | Remember, string concatenation will follow the order you specify in |
| 43 | the `properties` property. |
| 44 | |
| 45 | ## Scenarios |
| 46 | |
| 47 | You may encounter the following scenarios: |
| 48 | |
| 49 | ### Meaningless Document Keys |
| 50 | Sometimes, you may receive documents like '{ "xyz": "Michele", "abc": |
| 51 | "Riva", "qwe": 30 }'. You should read all the documents and try to |

TABLE 7-continued

| | Sample LLM Prompt |
|---|---|
| 52 | infer the data type. For example, in that case, first name, last |
| 53 | name, and age. |
| 54 | If you do that, fill in the `rename` property as follows: |
| 55 | |
| 56 | ```json |
| 57 | { |
| 58 |   "properties": ["xyz", "abc", "qwe"], |
| 59 |   "includeKeys": ["qwe"] , |
| 60 |   "includeKeys": ["qwe"] , |
| 61 |   "rename": { "xyz": "First Name", "abc": "Last Name", "qwe": "Age" } |
| 62 | } |
| 63 | ``` |
| 64 | So that the final concatenated string will look like this: |
| 65 | |
| 66 | ```plaintext |
| 67 | First Name: Michele. Last Name: Riva. Age: 30. |
| 68 | ``` |
| 69 | |
| 70 | ### Unable to Infer Data Type |
| 71 | |
| 72 | If you get very cryptic data like `[{ "xyz": "asd", "qwe": "lorem |
| 73 | ipsum" }, { "xyz": "foo", "qwe": "bar" }]` just return an object with |
| 74 | an `"error"` property: |
| 75 | |
| 76 | ```json |
| 77 | { |
| 78 |   "error": "Unable to determine data type for the input documents" |
| 79 | } |
| 80 | ``` |

It can be seen that the system prompt contains a first sample document in lines 7-13, and a second sample document in lines 14-21. It further contains a proper set of properties to return for the sample documents in line 28. Table 8 below contains a sample user prompt submitted by the facility to the large language model in connection with the system prompt shown above in Table 7.

TABLE 8

| | Sample LLM Prompt |
|---|---|
| 1 | """ |
| 2 | ## Documents |
| 3 | {documents} |
| 4 | """ |

It can be seen that the user prompt in line 3 incorporates the documents of the corpus to be analyzed by the large language model.

In various embodiments, the facility uses an LLM prompt that is different in a variety of ways from the sample prompt shown in Tables 7 and 8. In some embodiments, over time, the facility automatically adapts the LLM prompt it is using to limit the adjustments made by editorial users to the lists of properties it selects. In some embodiments, the facility uses an LLM to automatically make these adjustments to the prompt.

In act 1003, the facility presents the properties selected in act 1002 to an editorial user. For example, in some embodiments, in this presentation, the facility displays a full list of document properties, with the automatically selected properties checked. In act 1004, the facility receives user input either approving or adjusting the selected properties, such as by unchecking selected properties, and/or checking unselected properties. In act 1005, as described elsewhere herein, the facility generates an index incorporating the selected properties as approved or adjusted in act 1004. In act 1006, the facility stores the index generated in act 1005 stores the index, for use in performing searches against the corpus, operating a contextual chatbot against the corpus, performing LLM queries against the corpus, etc. In act 1007, the facility retrains the machine learning mechanism applied in act 1002 using results of the approval or adjustment indicated by the user input received in act 1004. After act 1007, this process concludes.

FIG. 11 is a flow diagram showing a process performed by the facility in some embodiments to retrain its machine learning mechanism. In act 1101, the facility receives training observations each including a document and those properties that were selected, approved, or adjusted by an editorial user or other person. In act 1102, the facility trains the machine learning mechanism using the training observations received in act 1101, such as via model retraining or supplemental training, or LLM prompt revision. After act 1102, the facility continues in act 1101.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. One or more memory devices collectively having contents configured to cause a computing system to perform a method, the method comprising:

accessing one or more training documents, each of the training documents having contents;

accessing, for each of the training documents, a list of properties of the training document that should be indexed;

for each of the accessed training documents, constructing a training example comprising (1) the training document's contents and (2) the list of properties of the training document that should be indexed;

accessing a corpus of documents to be indexed;

constructing and submitting a textual prompt to a large language model, wherein the textual prompt specifies (1) the constructed training examples, (2) the accessed corpus of documents, (3) an indication that the training examples should be used as a basis to identify in the corpus of documents properties that should be used to index documents of the corpus, and (4) a request for a response that specifies at least the identified properties that should be used to index documents of the corpus;

receiving from the large language model the response to the prompt that identifies, for each of the documents of the corpus, a list of properties that are automatically selected by the large language model and proposed to be a basis for an index should be included in an index on the corpus for the document of the corpus; and selecting the properties identified in the response received from the large language model to construct, at least in part, an index on the documents of the corpus.

2. The one or more memory devices of claim 1 wherein the accessed lists of properties include properties that would be common to search on or filter on for the document of the corpus.

3. The one or more memory devices of claim 1, the method further comprising:

constructing the index on the documents of the corpus that is based on the selected properties.

4. The one or more memory devices of claim 3, the method further comprising:

before the constructing:

causing the properties identified in the response received from the large language model to be presented to a user; and receiving input originated by the user:

selecting one or more unselected document properties, unselecting one or more selected document properties, or selecting one or more unselected document properties and unselecting one or more selected document properties; and adjusting selection among the document properties in accordance with the received input.

5. The one or more memory devices of claim 3 wherein the constructed index is a tree structure mapping from the selected properties to the documents of the corpus having those properties.

6. The one or more memory devices of claim 3 wherein the constructing comprises:

for each document of the corpus, concatenating the document's contents of the selected properties into a representation of the document;

encoding the representation of the document into a vector wherein the constructed index maps from the vectors produced by the encoding to the corresponding document of the corpus.

7. The one or more memory devices of claim 3, the method further comprising:

using the constructed index to conduct a search of the corpus.

8. The one or more memory devices of claim 3, the method further comprising:

using the constructed index to service a chatbot interaction with respect to the corpus.

9. A computer-implemented method comprising:

accessing one or more training documents, each of the training documents having contents;

accessing, for each of the training documents, a list of properties of the training document that should be indexed;

for each of the accessed training documents, constructing a training example comprising (1) the training document's contents and (2) the list of properties of the training document that should be indexed;

accessing a corpus of documents to be indexed;

constructing and submitting a textual prompt to a large language model, wherein the textual prompt specifies (1) the constructed training examples, (2) the accessed corpus of documents, (3) an indication that the training examples should be used as a basis to identify in the corpus of documents properties that should be used to index documents of the corpus, and (4) a request for a response that specifies at least the identified properties that should be used to index documents of the corpus;

receiving from the large language model the response to the prompt that identifies, for each of the documents of the corpus, a list of properties that are automatically selected by the large language model and proposed to be a basis for an index should be included in an index on the corpus for the document of the corpus; and selecting the properties identified in the response received from the large language model to construct, at least in part, an index on the documents of the corpus.

10. The method of claim 9 wherein the accessed lists of properties include properties that would be common to search on or filter on for the document of the corpus.

11. The method of claim 9, further comprising:

constructing the index on the documents of the corpus that is based on the selected properties.

12. The method of claim 11, further comprising:

before the constructing:

causing the properties identified in the response received from the large language model to be presented to a user; and receiving input originated by the user:

selecting one or more unselected document properties, unselecting one or more selected document properties, or selecting one or more unselected document properties and unselecting one or more selected document properties; and adjusting selection among the document properties in accordance with the received input.

13. The method of claim 11 wherein the constructed index is a tree structure mapping from the selected properties to the documents of the corpus having those properties.

14. The method of claim 11 wherein the constructing comprises:

for each document of the corpus, concatenating the document's contents of the selected properties into a representation of the document;

encoding the representation of the document into a vector wherein the constructed index maps from the vectors produced by the encoding to the corresponding document of the corpus.

15. The method of claim 11, further comprising:

using the constructed index to conduct a search of the corpus.

16. The method of claim 11, further comprising:

using the constructed index to service a chatbot interaction with respect to the corpus.

17. A system, comprising:

one or more processors; and memory storing content that, when executed by the one or more processors, cause the system to perform a method comprising:

accessing one or more training documents, each of the training documents having contents;

accessing, for each of the training documents, a list of properties of the training document that should be indexed;

for each of the accessed training documents, constructing a training example comprising (1) the training document's contents and (2) the list of properties of the training document that should be indexed;

accessing a corpus of documents to be indexed;

constructing and submitting a textual prompt to a large language model, wherein the textual prompt specifies (1) the constructed training examples, (2) the accessed corpus of documents, (3) an indication that the training examples should be used as a basis to identify in the corpus of documents properties that should be used to index documents of the corpus, and (4) a request for a response that specifies at least the identified properties that should be used to index documents of the corpus;

receiving from the large language model the response to the prompt that identifies, for each of the documents of the corpus, a list of properties that are automatically selected by the large language model and proposed to be a basis for an index should be included in an index on the corpus for the document of the corpus; and selecting the properties identified in the response received from the large language model to construct, at least in part, an index on the documents of the corpus.

18. The system of claim 17 wherein the accessed lists of properties include properties that would be common to search on or filter on for the document of the corpus.

19. The system of claim 17, the method further comprising:

constructing the index on the documents of the corpus that is based on the selected properties.

20. The system of claim 19, the method further comprising:

before the constructing:

causing the properties identified in the response received from the large language model to be presented to a user; and receiving input originated by the user:

selecting one or more unselected document properties, unselecting one or more selected document properties, or selecting one or more unselected document properties and unselecting one or more selected document properties; and adjusting selection among the document properties in accordance with the received input.

21. The system of claim 19 wherein the constructed index is a tree structure mapping from the selected properties to the documents of the corpus having those properties.

22. The system of claim 19 wherein the constructing comprises:

for each document of the corpus, concatenating the document's contents of the selected properties into a representation of the document;

encoding the representation of the document into a vector wherein the constructed index maps from the vectors produced by the encoding to the corresponding document of the corpus.

23. The system of claim 19, the method further comprising:

using the constructed index to conduct a search of the corpus.

24. The system of claim 19, the method further comprising:

using the constructed index to service a chatbot interaction with respect to the corpus.

\*   \*   \*   \*   \*